United States Patent [19]

Nakanishi et al.

[11] Patent Number: 5,156,794
[45] Date of Patent: Oct. 20, 1992

[54] PULVERIZING/KNEADING APPARATUS AND METHOD FOR MANUFACTURING SOAP USING THE PULVERIZING/KNEADING APPARATUS

[75] Inventors: Nozomu Nakanishi; Hironobu Otani; Takeshi Hasegawa; Shinichi Watanabe, all of Wakayama, Japan

[73] Assignee: Kao Corporation, Tokyo, Japan

[21] Appl. No.: 720,673

[22] Filed: Jun. 25, 1991

[30] Foreign Application Priority Data

Jun. 27, 1990 [JP] Japan .................................. 2-170783
Jul. 10, 1990 [JP] Japan .................................. 2-184953

[51] Int. Cl.⁵ .......................................... B29C 47/52
[52] U.S. Cl. ..................... 264/349; 241/236; 252/134; 252/367; 252/370; 264/101; 264/211.11; 366/77; 366/84; 366/272; 425/202; 425/204
[58] Field of Search ............ 264/349, 101, 211.11; 425/202, 382.4, 204, 208; 252/367, 369, 370, 108, 134; 366/77, 84, 272; 241/14, 236

[56] References Cited

U.S. PATENT DOCUMENTS

| | | | |
|---|---|---|---|
| 2,434,707 | 1/1948 | Marshall | 264/349 |
| 2,698,962 | 1/1955 | Swallow | 264/349 |
| 2,767,437 | 10/1956 | Marshall | 264/349 |
| 3,105,268 | 10/1963 | Albright | 425/376.1 |
| 3,497,912 | 3/1970 | Fischer | 425/204 |
| 3,856,278 | 12/1974 | Eisenmann | 366/84 |

FOREIGN PATENT DOCUMENTS

| | | | |
|---|---|---|---|
| 1190800 | 7/1989 | Japan . | |
| 638364 | 6/1950 | United Kingdom | 425/204 |
| 1170728 | 11/1969 | United Kingdom | 425/204 |

OTHER PUBLICATIONS p. 194 of "Kneading Apparatus" by Kenji Hashimoto, issued Sep. 20, 1986.

Primary Examiner—Jeffery Thurlow

[57] ABSTRACT

A pulverizing/kneading apparatus for pulverizing and kneading a material such as a soap compound. The material is supplied in a barrel in which are provided a pair of shafts respectively having feeding helical gears and returning helical gears. The material supplied is kneaded and the fine particles contained in the material pulverized by the gears. The forward driving force of the feeding gears is larger than the backward driving force of the returning gears so that the material advances forwardly toward the discharge opening of the barrel.

11 Claims, 5 Drawing Sheets

PULVERIZING/KNEADING APPARATUS AND METHOD FOR MANUFACTURING SOAP USING THE PULVERIZING/KNEADING APPARATUS

BACKGROUND OF THE INVENTION

1. Field of the Invention

The present invention generally relates to an apparatus for kneading material of cosmetics such as lipstick, food such as chocolate, material of resin product, soap and the like and/or pulverizing fine particles contained in the material, and a method for manufacturing soap using the pulverizing/kneading apparatus.

2. Description of the Related Art

According to a known method for manufacturing solid soap, for an example, after neat soap is dried, extruded in pellet configuration by a plodder then, pigment and perfume are mixed with the dried ground of the extruded pellet soap, the mixture is kneaded, and an extrusion molding is then carried out. But hard and fine particles existing on the surface of the soap molded according to this method are rough to the touch. This is because fine particles contained in the soap compound have not been pulverized sufficiently.

Conventionally, there have been provided some pulverizing/kneading apparatuses for solving this problem. One of the known apparatuses for kneading the material, such as dried neat soap, to make a uniform mixture is of a roll mill type in which rollers are mounted on several shafts parallel with each other so that the rollers are in contact with each other. Another known apparatus is of a paddle type in which paddles of a convex lens configuration in section are mounted on two shafts in a barrel parallel with each other so that the axes of the paddles form a phase of 90° with each other, as disclosed in Japanese Patent Laid-Open Publication No. 1-190800. In the kneading apparatuses of the above-described type, the amount of fine particles contained in the material which are pulverized in the space between rollers or between paddles is small because the contact area between the rollers or between the paddles is small, and many fine particles remain contained in the material discharged from the apparatus because many fine particles pass without being pulverized between the rollers or the paddles or between the paddles and a barrel which accommodates the paddles. Therefore, after the material is molded, small hard particles existing on the surface of a molded product of the material are rough to the touch. Thus, these apparatuses are incapable of sufficiently solving the problem.

As a kneading apparatus to solve the problem that the surface of the product is rough because fine particles are in the material, a gear compounder is known, for example in a Japanese Publication "KNEADING APPARATUS" (page 194) published on Sep. 20, 1986 in Japan. The gear compounder comprises several pairs of shafts in parallel. The two shafts of each pair are parallel with each other in a horizontal plane. The pairs are arranged vertically. In each pair, the shafts have kneading double helical gears engaging with each other. In the gear compounder, fine particles contained in the material are pulverized between teeth in mesh and the material are kneaded by the rotation of each gear by moving the material downward from above so that it passes between each pair of gears.

If the viscosity of the material is low, the gear compounder is capable of sufficiently kneading the material and pulverizing particles contained therein. However, if the material is solid or the viscosity thereof is very high, the material sticks to the tooth surface and hardly flows downward under the gears. Thus, the amount of the material which can be kneaded per unit time is very small, and the apparatus requires enlargement to increase the amount which can be kneaded.

SUMMARY OF THE INVENTION

Accordingly, an essential object of the present invention is to solve the above-mentioned problems and to provide a pulverizing/kneading apparatus capable of increasing the amount of the material which can be processed by simultaneously effectively kneading the material and pulverizing fine particles contained therein even if the material is solid or the viscosity thereof is very high and fine particles are contained in the material.

Another object of the present invention is to provide a method for manufacturing soap using the above-described apparatus.

According to the present invention, a pulverizing/kneading apparatus constructed as below is provided.

That is, this apparatus comprises: a barrel having a pulverizing/kneading chamber extending substantially horizontally, a supply opening for a material such as soap compound positioned in a center of one end of said pulverizing/kneading chamber and communicating with an upper portion of said pulverizing/kneading chamber, a discharge opening positioned in the other end of said pulverizing/kneading chamber and communicating with a lower portion of said pulverizing/kneading chamber; two shafts extending substantially horizontally through said pulverizing/kneading chamber and rotatably supported by said barrel with bearings; and driving means for rotating said two shafts.

Said two shafts are respectively provided with first pulverizing/kneading gears comprising feeding gears located at the supply opening side in said barrel to engage with each other between said two shafts; and returning gears engaging with each other between said two shafts and tooth spaces of which communicate with those of said feeding gears. The first pulverizing/kneading gears on each of the shafts includes at least one pair of the feeding and returning gears, and preferably it includes a plurality of pairs of the feeding and returning gears.

The configuration of the inner surface of the barrel is formed to substantially tightly correspond to that of the peripheral configuration of the feeding and returning gears.

The teeth of the feeding gears have a helical direction for feeding the material toward the discharge opening side; while the teeth of the returning gears have a helical direction for returning the material toward the supply opening side.

In order to make the force of the feeding gears for driving the material forward greater than the force of the returning gears for driving the material backward, the helical angle of the feeding gears may be substantially equal to that of the returning gears and the tooth width of the feeding gears may be longer than that of the returning gears or the tooth width of the feeding gears may be substantially equal to that of the returning gears and the helical angle of the feeding gears may be greater than that of the returning gear.

According to the above-described construction, the material such as soap compound is supplied, through the supply opening, to the upper portion of the feeding gears rotating, thus moving into the tooth space thereof. With the progress of the engagements of the feeding gears between the two shafts, the material in the tooth spaces is pressed out therefrom by the mating gear teeth and most of the material is fed toward the discharge opening side along the tooth space. With a further progress of the engagement therebetween, fine particles contained in the material which have remained in the tooth spaces are pulverized between each tooth in mesh, thus moving to the discharge opening side along the shafts.

When the material is conveyed to the vicinity of the boundary between the feeding gears and the returning gears, the material in the tooth spaces of the feeding gears moves toward the discharge opening side, while the material in the tooth spaces of the returning gears returns toward the supply opening side. As a result, the material is mixed or kneaded sufficiently and most of mixed material in each tooth space moves to an adjacent tooth space through a slight space between each gear and the inner surface of the barrel. With a further progress of the engagement of the gears, the material which has remained in the tooth space is strongly compressed and fine particles contained therein are pulverized by the teeth in mesh. In this construction, the material moves from the supply opening side to the discharge opening side as a whole, even if the material partly moves to the supply opening side, since the forward driving force of the feeding gears is stronger than the backward driving force of the returning gears.

Thus, the above construction is capable of feeding the material from the supply opening side to the discharge opening side as a whole while fine particles are being pulverized. In the above construction, when the material is continuously supplied in the supply opening in such an amount as to fill the engaging portion of the tooth space of the mating feeding gears and the portion immediately above the engaging portion, the material is sequentially pressed out forward in the tooth spaces by the engagement of the mating feeding gears, and consequently, the material on the discharge opening side with respect to the engaging portion is pressed from behind, thus moving forward. Thus, the problem that the material sticks to the tooth and does not move forward does not occur. Therefore, unlike the conventional apparatus, a sufficient processing amount of material can be obtained. Further, it is unnecessary to make the apparatus of enlarged size in order to obtain a predetermined amount of kneaded and pulverized material.

In the above construction, there is preferably provided screw means for feeding said material which has passed the returning gears toward the discharge opening side is mounted on each of the two shafts at the discharge opening side with respect to the returning gears; second pulverizing/kneading gears provided on each of the two shafts at the discharge opening side with respect to the screw means so as to engage with each other between the two shafts, and throttle means mounted on the discharge opening for restricting the amount of the material to be discharged. The pulverizing/kneading gears may be composed of the combination of first helical gears, the helical direction of which is set in the feeding direction, and second helical gears, the helical direction of which is set in the returning direction, or of only helical gears, the helical direction of which is set in the feeding direction or of spur gears.

The above preferable construction allows the screw means to feed the material which has passed the returning gears toward the discharge side at a faster speed. Accordingly, the supply opening side with respect to the screw means is not completely filled with the material, but the discharge opening side is completely filled therewith by throttling the throttle means. Owing to this construction, since the second pulverizing/kneading gears are provided in the discharge opening side, the material penetrates into the space between all tooth spaces and the barrel. With the rotations of the gears, the material in all the tooth spaces is pressed out therefrom by the tooth of the mating gears, thus moving in the barrel. Thus, compared with an apparatus comprising only the feeding gears and the returning gears, the material can be very efficiently kneaded.

In the above construction, there is preferably provided in the barrel, a stopper plate contacting the forward side of the first pulverizing/kneading gears. The stopper plate has, at its center, a discharge opening confronting the engaging portion of such gears. Also, there provided in the barrel another similar stopper plate contacting the forward side of the second pulverizing/kneading gears.

This construction discharges only the material which has passed the engaging portion of the first and second pulverizing/kneading gears from the discharge opening of the stopper plates. Therefore, the material can be obtained with fine particles thereof being reliably pulverized.

Furthermore, according to the present invention there is provided a method for manufacturing soap including a step for kneading a soap compound and/or pulverizing fine particles contained in the soap compound using a pulverizing/kneading apparatus as found below.

Namely, the apparatus used in the method comprises a barrel having a pulverizing/kneading chamber extending substantially horizontally, two shafts extending substantially horizontally through the pulverizing/kneading chamber and rotatably supported by the barrel with bearings. The two shafts are provided with feeding gears generating a forward driving force and engaging with each other between the two shafts and returning gears generating a backward driving force and engaging with each other between the shafts with their tooth spaces communicating with tooth spaces of the feeding gears. The chamber of the barrel is formed along the peripheral configuration of the feeding and returning helical gears.

The method according to the present invention comprises the steps of:

successively feeding the soap compound into the barrel in which the two shafts are rotating together with the feeding and returning gears, and moving the soap compound positioned through tooth spaces of the feeding and returning gears and space between the tooth of the feeding and returning gears and the barrel so that the soap compound is pulverized and/or kneaded.

Soap compounds to be processed by the method according to the present invention include a fatty acid alkali metallic soap or a mixture of more than one fatty acid alkali metallic soap obtained by the reaction of vegetable oil or animal oil or a mixture thereof, respectively, having alkyl group or alkenyl group having 8–24 carbons, respectively; ester or fatty acid obtained from these oils and alkali agent (alkali metal hydroxide)-;

vegetable oils include palm kernel, palm stearin, coconut oil, olive oil, castor oil, sesame oil, cotton seed oil, soybean oil, tung oil, peanut oil, and rape seed oil-; and animal oils including beef tallow, lard, and whale oil. Additives such as chelating agent, humectant, anti-oxidant, pigment, perfume, fungicide and super fatting agent may be added as needed. Favorably, the water content of fatty acid alkali metallic soap is made 5-30 wt % by drying it as needed after neutralization reaction or saponification reaction is carried out, and more favorably, 11-16 wt %.

According to this method, the soap compound is supplied to the engaging portion of the feeding helical gears or the portion immediately above the engaging portion of the feeding helical gears rotating, then, with a progress of the engagement of the feeding helical gears in mesh between the two shafts, the soap compound is pressed out therefrom by the tooth of the mating gears, and as a result, most of the soap compounds moves toward the returning helical gears along the tooth spaces. With a further progress of the engagement therebetween, the soap compound which has remained in the tooth space moves forward axially while fine particles are being pulverized between the teeth of the gears in mesh.

When the soap compound is conveyed to the vicinity of the boundary between the feeding helical gears and the returning helical gears, the soap compound in the tooth spaces of the feeding helical gears moves toward the returning helical gears while the soap compound in the tooth spaces of the returning helical gears returns toward the feeding helical gears. As a result, most of the soap compound in each tooth spaces mix with each other, thus escaping to an adjacent tooth space through a slight space between each gear and the inner surface of the barrel. With a further progress of the engagement, the soap compound in the tooth space is strongly compressed and fine particles contained therein are pulverized by the gears in mesh. In this construction, by making the forward driving force of the feeding helical gears for driving the soap compound forward stronger than the backward driving force of the returning helical gears for driving it backward, the soap compound moves forward as a whole even though it partially moves backwardly.

Thus, fine particles contained in the soap compound are pulverized and the soap compound moves forward as a whole through the returning helical gears. The soap compound is sequentially pressed out forward from the tooth spaces by the engagement of the helical gears in mesh by supplying the soap compound in such an amount as to fill the engaging portion of the feeding helical gears and the portion immediately above the engaging portion, and consequently, the soap compound in the engaging portion of the feeding helical gears is sequentially pressed from behind, thus moving forward. Thus, the problem that the soap compound sticks to gear teeth and does not move forward does not occur. Therefore, unlike the conventional apparatus, a sufficient amount of soap compound can be obtained in a short period of time.

BRIEF DESCRIPTION OF THE DRAWINGS

These and other objects and features for the present invention will become apparent from the following description taken in conjunction with the preferred embodiment thereof with reference to the accompanying drawings, in which.

DETAILED DESCRIPTION OF THE INVENTION

Before the description of the present invention proceeds, it is to be noted that like parts are designated by like reference numerals throughout the accompanying drawings.

Referring to FIGS. 1 through 7, a pulverizing/kneading apparatus and a method for kneading a soap compound and/or pulverizing fine particles contained in the soap compound by using the pulverizing/kneading apparatus, according to the embodiments of the present invention, are described below in detail.

An apparatus according to a first embodiment is described with reference to FIGS. 1 through 5.

Figure 1:
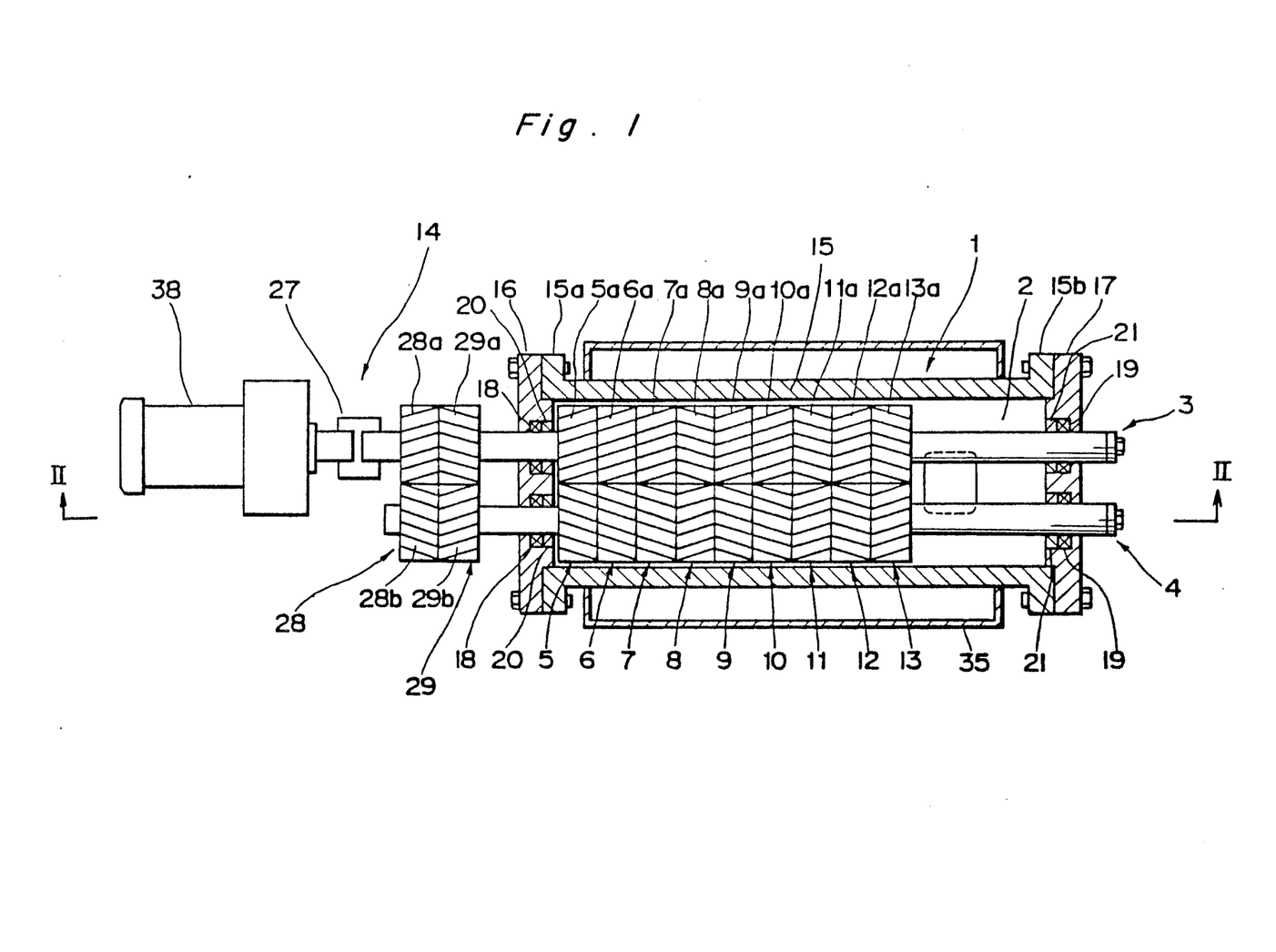
FIG. 1 is a plan view partly in section showing a pulverizing/kneading apparatus according to a first embodiment of the present invention.
Figure 2:
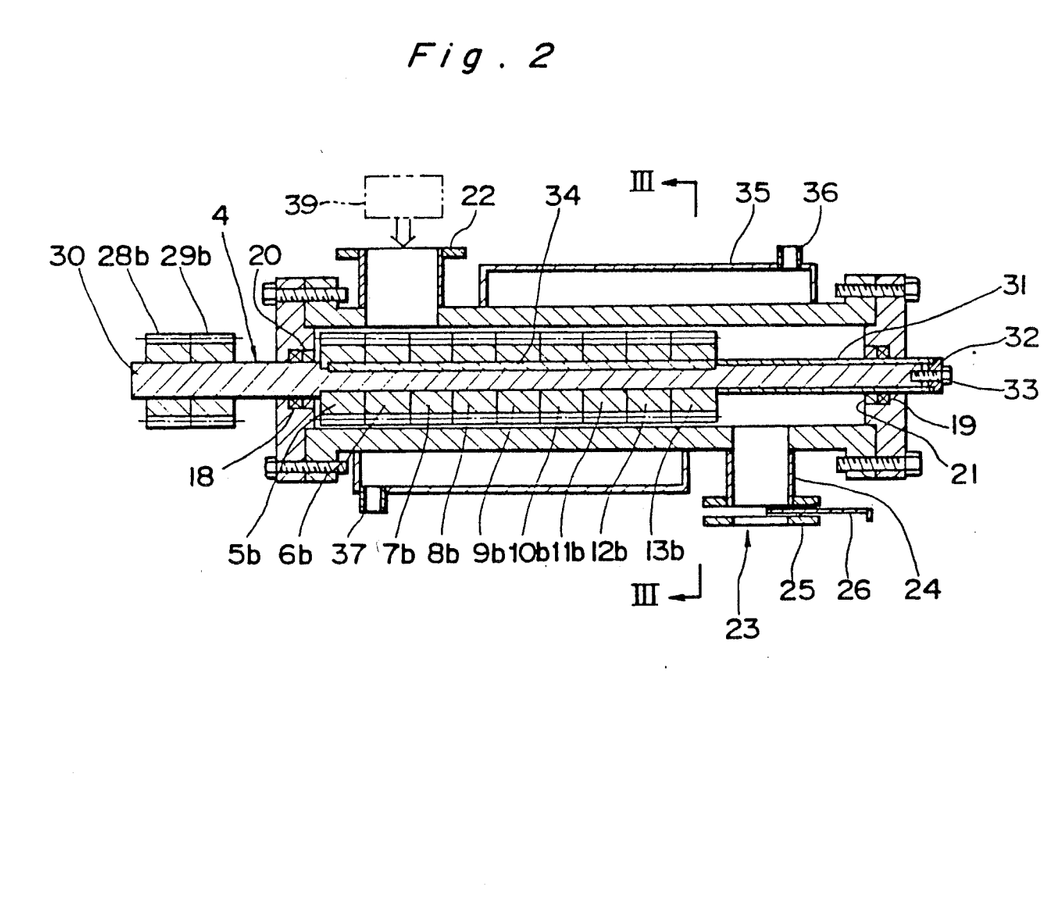
FIG. 2 is a sectional view taken along the line II—II shown in FIG. 1.
Figure 3:
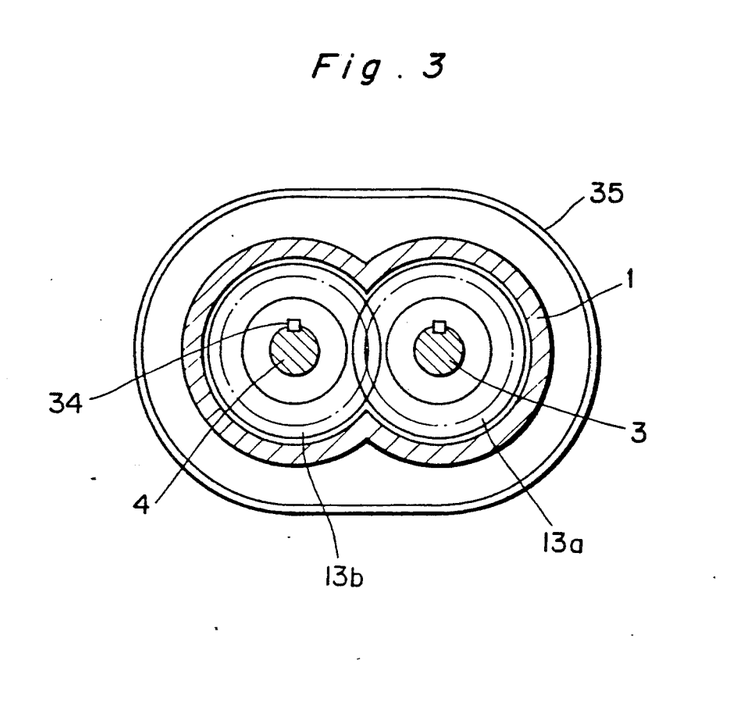
FIG. 3 is a sectional view taken along the line III—III shown in FIG. 2.

FIG. 1 is a plan view partly in section of the apparatus. FIG. 2 is a sectional view taken along the line II—II shown in FIG. 1. FIG. 3 is an enlarged sectional view taken along the line III—III shown in FIG. 2. As shown in FIG. 1 through FIG. 3, the pulverizing/kneading apparatus comprises a barrel 1 having a pulverizing/kneading chamber 2 extending substantially horizontally; two shafts 3 and 4 extending substantially horizontally through the barrel 1 and held by the barrel 1 with bearings 18 and 19; helical gears 5 (5a and 5b) through 13 (13a and 13b) mounted on the shafts 3 and 4 so that the gears 5 through 13 engage with each other; and a driving means 14 for driving the helical gears 5 through 13 and so that the material such as a soap compound is pulverized and kneaded between the helical gears 5 through 13.

The barrel 1 comprises a barrel main body 15 having opposite openings and flanges 15a and 15b formed at both end thereof and bearing housing plates 16 and 17 bolted on the flanges 15a and 15b. The bearing housing plates 16 and 17 contain each bearing 18 and 19 which rotatably hold the two shafts 3 and 4 on which the helical gears 5 through 13 are mounted. As shown in FIG. 3, the inner configuration of the barrel 1 substantially corresponds to the peripheral configuration of each helical gear 5 through 13. Sealing members 20 and 21 are secured to the inner side of each bearing housing plate 16 and 17 so as to prevent the leakage of the material.

A material supply opening 22 communicating with the pulverizing/kneading chamber 2 is formed at the left end of the barrel 1, and a material discharge opening 23 also communicating with the pulverizing/kneading chamber 2 is formed at the right end of the barrel 1. A supply means 39 for supplying the material in a predetermined amount continuously into the pulverizing/kneading chamber 2 is mounted on the supply opening 22. The discharge opening 23 comprises a discharge pipe 24, a guide plate 25, and a throttle plate 26 movable between the discharge pipe 24 and the guide plate 25 so that the size of the discharge opening can be varied. A water jacket 35 having a water supply pipe 37 and a water discharge pipe 36 is formed in the peripheral surface of the barrel 1 so that the water jacket 35 supplies cold or hot water to the pulverizing/kneading chamber 2 depending on the kind of material such as the kind of the soap compound.

A coupling 27 connects the left end of the shaft 3 and a motor 38 with each other. Driving gears 28a and 28b, 29a and 29b are mounted on each shaft 3 and 4 so as to transmit the rotation of the motor 38 to the shaft 4. The driving means comprises the motor 38, the coupling 27, and the driving gears 28 and 29. It is noted that the driving gears 28 and 29 are not necessarily provided. In this case, the shaft 4 or the helical gears 5b through 13b may be rotated via the helical gears 5a through 13a. As shown in FIG. 2, the shaft 4 comprises a shaft main body 30, a collar 31, and an end plate 32. The helical gears 5b through 13b are fixed to the shaft 4 by inserting the helical gears 5b through 13b from the right into the shaft main body 30 on which a key 34 has been mounted and then clamping the collar 31 with the end plate 32 and a bolt 33. Although a sectional view of the shaft 3 is not shown, the helical gears 5a through 13a are fixed to the shaft 3, similarly to the shaft 4. The helical gears 5 through 13 on each shaft 3 and 4 includes a plurality of pairs of feeding and returning gears (5a-7a:8a),(9a, 10a:11a),(12a:13a),(5b-7b:8b),(9b, 10b:11b), (12b:13b). The helical directions of the helical gears 5 through 13 are set as shown in FIG. 1. That is, when the gears are viewed from above as shown in FIG. 1, the helical direction of the gears 5, 6, 7, 9, 10, and 12 serving as gears for feeding the material toward the discharge opening side is set so that the teeth thereof spread from the supply opening side toward the discharge opening side, while the helical direction of the gears 8, 11, and 13 serving as gears for returning the material to the supply opening side is set so that the teeth thereof spread from the discharge opening side toward the supply opening side. The above-described helical directions are set pre-supposing that the engaging portions of the gears rotate downward in FIG. 1, however, in this apparatus, it is possible to set the helical direction opposite to the above if the engaging portions thereof is rotated upward.

Figure 4:
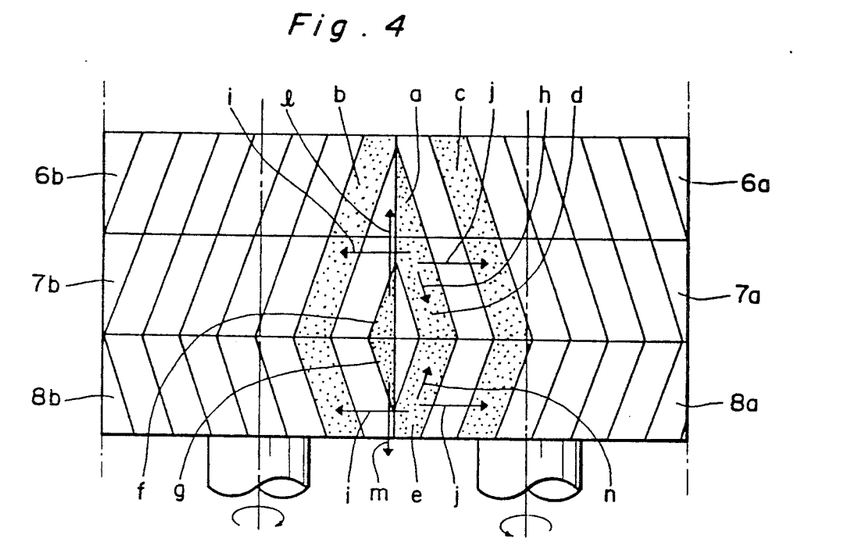
FIGS. 4 and 5 are explanatory views showing the state in which a material such as a soap compound is pulverized and kneaded.
Figure 5:
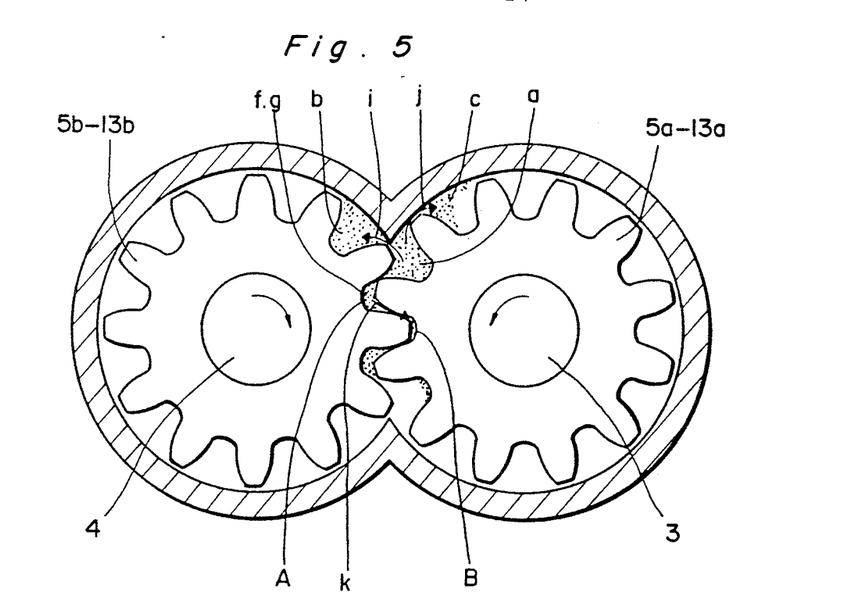

The kneading of the material such as the soap compound and the pulverization of fine particles contained therein are described referring to FIGS. 4 and 5.

The material supplied, by the supply means, from the supply opening 22 to the helical gears penetrates into the spaces between teeth at the upper portion of the engaging section of the gears. In FIGS. 4 and 5 the material is indicated by dots. The tooth spaces of the feeding gear 6a communicates with those of the feeding gears 7a. Therefore, with the progress of the engagements of the gears, the material in a tooth space (a) is sequentially pressed out therefrom by the tooth of the mating gear 6b engaging the tooth space (a) and consequently, most of the material advances in the direction shown by an arrow (h) along the tooth space (a) or passes over the mating gear 6b, thus moving into the tooth space (b) of the mating gear 6b as shown by an arrow (i). At this time, only a part of the remaining material passes through the narrow space between the tooth and the barrel as shown by an arrow (j), thus moving an adjacent tooth space (c) and repeatedly moved by the teeth of the mating gear 6b similarly to the movement of the material in the tooth space (a) as the engagement proceeds.

In the boundary between the feeding gear 7a and the returning gear 8a shown in FIG. 4, the material in a tooth space (d) moves in directions shown by the arrows (h), (i), and (j) with the engagement between the tooth space (d) and the teeth of the gear 7b. The material moving in the direction shown by the arrow (h) mixes with the material moving in a tooth space (e) in the direction shown by an arrow (n) due to the engagement between the tooth space (e) of the returning gear 8a and the tooth of the gear 8b. With a further progress of the engagement, similarly to tooth spaces (f) and (g) of each gear 7b and 8b as shown, the tooth spaces (d) and (e) engage the tooth of each mating gear on both sides thereof, thus forcibly compressing the material therein. This state is shown by (A) in FIG. 5. The material strongly compressed in the tooth space (A) escapes therefrom little by little through the space (backlash) between teeth as shown by an arrow (k). While the material is passing through the backlash, the teeth of both gears in mesh pulverize fine particles in the material contained in the backlash with a further progress of the engagement between both gears. The material which has passed through the backlash passes through a tooth bottom (B), thus moving in the axial opposed directions of the gears as shown by arrows (l) and (m).

Fine particles contained in the material are pulverized and kneaded while the material is moving between tooth spaces as described above, thus moving axially. Since the number of the feeding gears is larger than that of the returning gears as described previously, the forward driving force becomes larger than the backward driving force, resulting that the material pulverized and kneaded moves in the advancing direction shown by the arrow (h) from the supply opening side to the discharge opening side as a whole. The material is pushed from behind, thus progressing axially, so that the amount of the material to be processed is not reduced due to the adherence of the material to the teeth. Compared with the conventional apparatus, fine particles contained in the material are completely pulverized and a considerable amount of the material can be kneaded by successively supplying the material to the apparatus in such an amount as to make tooth spaces between gears in mesh full of the material. If the material contains no fine particles or if it is unnecessary to completely pulverize fine particles contained in the material, a large amount of material can be supplied to the apparatus by the supply means 39 so that the apparatus can be operated to knead the material by filling the entire barrel with the material. This method is capable of obtaining a high kneading efficiency even though a great amount of material is supplied to the apparatus.

Figure 6:
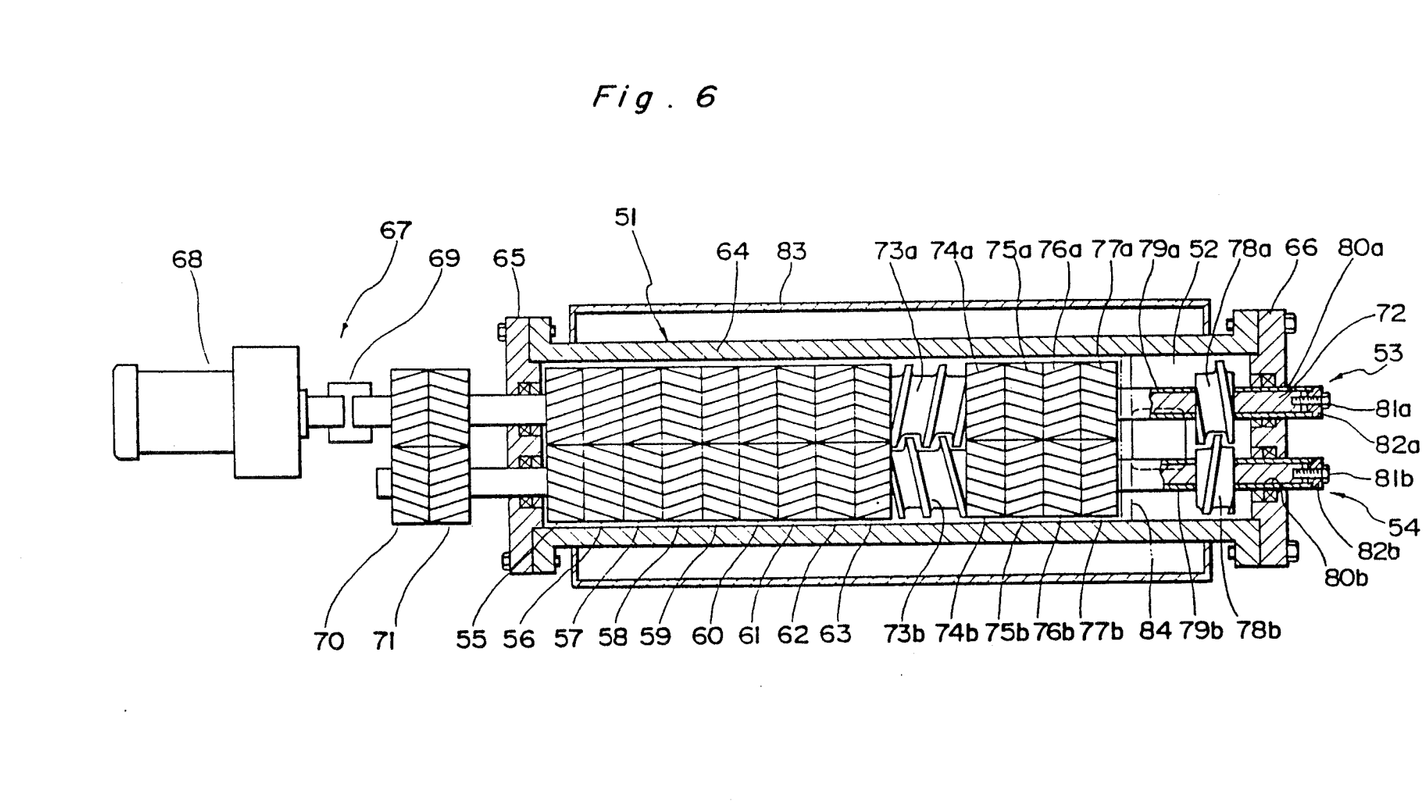
FIG. 6 is a plan view partly in section showing a pulverizing/kneading apparatus according to a second embodiment of the present invention.

An apparatus according to a second embodiment is described with reference to FIG. 6 which is a plan view partly in section of the apparatus.

As shown, in this apparatus, two shafts 53 and 54 are held substantially horizontally by bearing housing plates 65 and 66 mounted on both sides of a barrel 51 having a pulverizing/kneading chamber 52 longer than that of the apparatus according to the first embodiment so that the shafts 53 and 54 penetrate through the barrel 51 similarly to the first embodiment. A driving means 67 comprising a motor 68, a coupling 69, and driving gears 70 and 71 is provided on one end of the shaft 53 so as to drive each shaft 53 and 54. Similarly to the first embodiment, on the side at which the driving means 67 is provided in the barrel, feeding gears 55, 56, 57, 59, 60, and 62 and returning gears 58, 61, and 63 are mounted on the shaft 53 and 54 so that gears engage with each other between the two shafts. Similarly to the first embodiment, the barrel 51 is formed so that the inner configuration of the main body 64 thereof substantially coincides with the peripheral configuration of the helical gears 55 through 63, and the barrel 51 has in the periphery thereof the supply opening and the discharge opening of the material (not shown) and a water jacket 83.

On each shaft 53 and 54, first screws 73a and 73b which rotate together therewith are mounted on the right side of the helical gear 63. Helical gears 74 through 77 serving as second pulverizing/kneading gears in which the helical direction is alternated with each other are mounted on the right side of the first screws 73a and 73b so that the gears engage with each other between the two shafts. Screws 78a and 78b in which the helical direction is set opposite to that of the first screws 73a and 73b are mounted on the right side of the helical gear 77 so as to be spaced by the collars 79a and 79b. The above-described helical gears 55 through 63, 74 through 77, and the screws 73 and 78 are fixed to each shaft 53 and 54 by tightening the bolts 81a and 81b into the collars 80a and 80b via the end plate 82a and 82b.

In this construction, the material supplied from the supply opening is kneaded with fine particles contained therein pulverized in the same operation, similarly to the first embodiment, thus moving toward the discharge opening side through the helical gears 55-63. The screws 73 impart a strong driving force, toward the discharge opening side, to the material which has passed the gears 63, and a plate similar to the plate as described in the first embodiment and mounted at the discharge opening is throttled, so that the discharge opening side in the barrel with respect to the screws 73a and 73b is full of the material although the supply opening side in the barrel with respect to the screws 73a and 73b is not filled therewith. Accordingly, a certain pressure is generated in this portion, but the helical direction of the second screws 78a and 78b is opposite to that of the first screws 73a and 73b, that is, the material is pressed in the space defined by the screws 73 and 78, so that an excessive pressure is not applied to the sealing members mounted in the bearing housing plate 66.

Since, as described above the discharge opening side with respect to the screw 73a and 73b in the barrel 51 is filled with the material, the material is sufficiently kneaded compared with the pulverization of fine particles. The gears 55 through 63 alone are capable of pulverizing and kneading the material simultaneously, but the addition of the screw 73 and the gears 74 through 77 is very effective if it is necessary to knead the material further.

Figure 7:
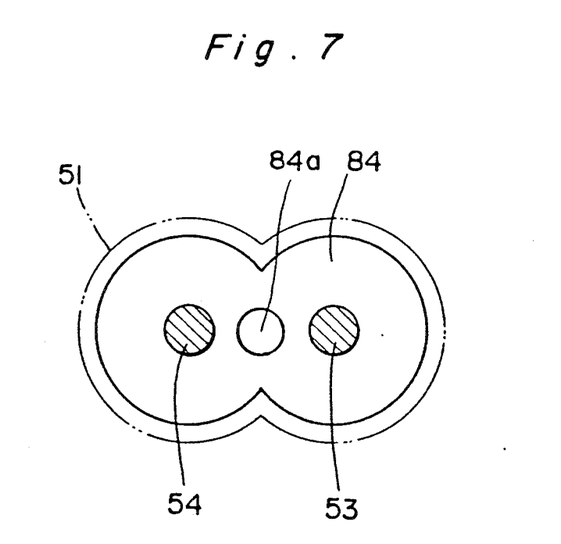
FIG. 7 is a side elevation showing a stopper plate to be used in the apparatus shown in FIG. 6.

It is preferable to provide a stopper plate 84, as shown in FIG. 7 indicating the side elevation thereof, on the discharge opening side of the gear 77, the configuration of which coincides with the inner configuration of the barrel 51 and has a central opening 84a formed only at the engaging portion of each pair of gears. Although not shown, the sealing members are mounted on the periphery of each shaft 53 and 54 to seal the through-holes in the stopper plate 84 through which the respective shafts 53 and 54 extend.

Since the provision of the stopper plate 84 causes the material to move to the discharge opening side only through the opening 84a, the material is reliably passed through the engaging portion of the gears so that the fine particles contained therein are reliably pulverized by the engaging portion.

It is possible in each embodiment described above to set the helical angle of the feeding gears 5, 6, 7, 9, 10, 12 and 55, 56, 57, 59, 60, 62 to be greater than that of the returning gears 8, 11, 13 and 58, 61, 63, respectively so as to increase the force for driving the material, so that the number of the feeding gear can be the same as that of the returning gear. By doing so, the number of gears may be reduced to miniaturize the apparatus.

Similarly to the first embodiment, in the second embodiment, the apparatus may be operated to knead the material by supplying the material from the supply means in such a great amount as to fill the barrel with the material. The stopper plate 84 described in the second embodiment may be provided on the discharge side immediately forward from the gear 13 in the first embodiment so as to increase the pulverizing effect of the apparatus.

TEST

The inventors had such a comparative test that soap compound as shown in Table 1 was kneaded and pulverized by the above-described pulverizing/kneading apparatuses according to the above first and second embodiment and a conventional apparatus having three rollers.

The number of revolution of the gears and the amount of the soap compound to be processed by each pulverizing/kneading apparatus according to the present invention was set as 200 rpm and 25 kg/hr, respectively. In the conventional apparatus having three rollers, the amount of the soap compound to be processed was 15 kg/hr and the number of the revolution of each of three rollers was set as 27, 49, and 87 rpm, respectively, and the soap compound was processed three times. The module, helical angle, outer diameter, and width of the gear of each kneading apparatus according to the present invention was 6, 15°, 106 mm, and 35 mm, respectively.

After the soap compound was kneaded, it was extruded by a vacuum duplex plodder having a screw of 80 mm in diameter and 400 mm in length and a screw of 110 mm in diameter and 440 mm in length and molded by a stamping machine to form soap of 72 mm long, 52 mm broad, and 35 mm thick. Then, three kinds of soaps were examined in the sense of touch in hand-washing, crack, and lather property.

TABLE 1

| | composition (wt %) |
| --- | --- |
| mixture of sodium soap of beef tallow fatty acid and sodium soap of coconut oil fatty acid in the ratio of 6:4 | 81 |
| coconut oil fatty acid | 6 |
| perfume | 1 |
| titanium dioxide | 0.2 |
| magnesium stearate | 0.5 |
| BHT (t-butylhydroxytoluene) | 0.2 |
| water | 11.1 |

1) Hand-washing test

A hand-washing test of each sample was carried out using water of 25±1° C. Lather property, solubility, and roughness degree were compared with a reference soap which was subjected to a hand-washing. The samples were ranked into three grades according to the result of each sample:
  rank 1: smooth
  rank 2: normal
  rank 3: rough
2) Crack test A nail of approximately 5 cm was stuck to the edge of each sample which was hung with a wire approximately 0.3 mm in diameter, then each sample was immersed in water of 25° C. for three hours. After the sample was taken out from the water and left for 24 hours at the room temperature while the sample was hung with the wire. The samples were ranked into the following three grades by visually observing each sample.
  rank 1: no crack or slight crack
  rank 2: partly cracked
  rank 3: cracked throughout sample
3) Lather test Using a test device comprising a holder for fixing the position of each sample soap and sponge which moves vertically in parallel with the surface of the sample soap. The sponge is immersed in water contained in a container when the sponge is positioned at the lower end of the vertical movement thereof. The speed of the sponge in its vertical movement was set so that it reciprocates 22 times a minute. The lather property value is indicated by the number of strokes of the sponge when a whole surface of the water is covered with bubbles.

Tables 2(a), 2(b), and 2(c) show the kneading/pulverizing condition of each sample soap compound consisting of the compositions shown in Table 1 and the quality evaluation of each soap molded with the plodder and the stamping machine. In Table 2(a) the apparatus according to the first embodiment of the present invention was used, in Table 2(b) the apparatus according to the second embodiment of the present invention was used, and in Table 2(c) the conventional apparatus including three rolls was used.

TABLE 2(a)

| apparatus according to the first embodiment | | |
|---|---|---|
| kneading/ pulverizing condition | soap compound | same composition as Table 1 |
| | supplied amount (kg/hr) | 25 |
| | number of revolution (rpm) | 200 |
| | processed number of times | 1 |
| quality | hand-washing test | 1 |
| | crack test | 1 |
| | lather property test | 10 |

TABLE 2(b)

| apparatus according to the second embodiment | | |
|---|---|---|
| kneading/ pulverizing condition | soap compound | same composition as Table 1 |
| | supplied amount (kg/hr) | 25 |
| | number of revolution (rpm) | 200 |
| | processed number of times | 1 |
| quality | hand-washing test | 1 |
| | crack test | 1 |
| | lather property test | 4 |

TABLE 2(c)

| apparatus including three rollers | | |
|---|---|---|
| kneading/ pulverizing condition | soap compound | same composition as Table 1 |
| | supplied amount (kg/hr) | 15 |
| | number of revolution (rpm) | 27, 49, 87 |
| | processed number of times | 3 |
| quality | hand-washing test | 3 |

TABLE 2(c)-continued

| apparatus including three rollers | |
|---|---|
| crack test | 3 |
| lather property test | 15 |

As apparent from these tables, the soap molded by each pulverizing/kneading apparatus according to the present invention is more favorable to the touch, cracked less, and more favorable in lather property than the soap molded with the pulverizing/kneading apparatus comprising the three rollers although the pulverizing/kneading apparatus according to the present invention processed more amount of soap compound per unit time than the kneading apparatus comprising three rollers did. That is, in order to obtain soap of equal to or higher in quality than the soap manufactured according to the conventional method, the present invention is capable of kneading a soap compound in a period of time shorter than that required for the conventional method to do.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A pulverizing/kneading apparatus for kneading material and/or pulverizing fine particles contained in the material comprising:
  a barrel including a pulverizing/kneading chamber extending substantially horizontally and a first end portion and a second end portion, said first end portion having a supply opening structure for receiving the material positioned in a center thereof communicating with an upper portion of said pulverizing/kneading chamber, said second end portion having a discharge opening structure disposed therein communicating with a lower portion of said pulverizing/kneading chamber,
  two shafts extending substantially horizontally through said pulverizing/kneading chamber, each of said two shafts being rotatably supported by said barrel by bearings, and
  driving means for rotating said two shafts,
  said two shafts being respectively provided with at least one pair of first pulverizing/kneading gears including feeding gears located at the supply opening side in said barrel to engage with each other between said two shafts; and returning gears engaging with each other between said two shafts and tooth spaces of which communicate with those of said feeding gears,
  the configuration of the inner surface of said barrel being formed to substantially tightly correspond to that of the peripheral configuration of said feeding and returning gears,
  said teeth of the feeding gears having a helical direction for feeding the material toward the discharge opening side, while said teeth of the returning gears having a helical direction for returning said material toward the supply opening side.

2. The pulverizing/kneading apparatus as claimed in claim 1, wherein said first pulverizing/kneading gears on each of said two shafts comprise a plurality of pairs of said feeding and returning gears.

3. The pulverizing/kneading apparatus as claimed in claim 1, further comprising a stopper plate contacting a forward side of said first pulverizing/kneading gears and having, at its center, a stopper plate discharge opening confronting the engaging portion of said first pulverizing/kneading gears.

4. The pulverizing/kneading apparatus as claimed in claim 1, further comprising:
   screw means for feeding the material which has passed said returning gears toward the discharge opening side mounted on each of said two shafts at the discharge opening side with respect to said returning gears;
   second pulverizing/kneading gears provided on each of said two shafts at the discharge opening side with respect to said screw means so as to engage with each other between said two shafts, and
   throttle means mounted on said discharge opening structure for restricting the amount of the material to be discharged.

5. The pulverizing/kneading apparatus as claimed in claim 4, further comprising a stopper plate contacting a forward side of said second pulverizing/kneading gears and having, at its center, a stopper plate discharge opening confronting the engaging portion of said second pulverizing/kneading gears.

6. The pulverizing/kneading apparatus as claimed in claim 1, wherein the helical angle of said feeding gears is substantially equal to that of said returning gears and a tooth width of said feeding gears is longer than that of said returning gears, whereby a forward driving force caused by said feeding gears becomes larger than a backward driving force caused by said returning gears.

7. The pulverizing/kneading apparatus as claimed in claim 1, wherein a tooth width of said feeding gears is substantially equal to that of said returning gears and the helical angle of said feeding gears is greater than that of said returning gears, whereby a forward driving force caused by said feeding gears becomes larger than a backward driving force caused by said returning gears.

8. A pulverizing/kneading apparatus for kneading material and pulverizing fine particles contained in the material comprising:
   a barrel including a pulverizing/kneading chamber extending substantially horizontally and a first end portion and a second end portion, said first end portion having a supply opening structure for receiving the material positioned in a center thereof communicating with an upper portion of said pulverizing/kneading chamber, said second end portion having a discharge opening structure disposed therein communicating with a lower portion of said pulverizing/kneading chamber,
   two shafts extending substantially horizontally through said pulverizing/kneading chamber, each of said two shafts being rotatably supported by said barrel by bearings, and
   driving means for rotating said two shafts,
   said two shafts being respectively provided with first pulverizing/kneading gears including feeding gears located at the supply opening side in said barrel to engage with each other between said two shafts; and returning gears which located at the discharge opening side to engage with each other between said two shafts and tooth spaces of which communicate with those of said feeding gears,
   the configuration of the inner surface of said barrel being formed to substantially tightly correspond to that of the peripheral configuration of each said feeding and returning gear,
   said teeth of the feeding gears having a helical direction for feeding the material toward the discharge opening side when said feeding gears rotate in directions such that engaging portions thereof move downwardly, while said teeth of the returning gears having a helical direction for returning the material toward the supply opening side with a backward driving force less than a forward driving force by said feeding gears when engaging portions thereof move downwardly,
   said supply opening being provided with a material supply means for supplying the material into said barrel so that only the engaging portions of said feeding gears and portions immediately above said engaging portion thereof are filled by the material.

9. The pulverizing/kneading apparatus as claimed in claim 8, further comprising:
   screw means for feeding the material which has passed said returning gears toward the discharge opening side mounted one each of said two shafts at the discharge opening side with respect to said returning gears, a forward driving force caused by said screw means being greater than that caused by said first pulverizing/kneading gears;
   second pulverizing/kneading gears provided on each of said two shafts at the discharge opening side with respect to said screw means so as to engage with each other between said two shafts, and
   throttle means mounted on said discharge opening structure for restricting the amount of the material to be discharged.

10. A method for manufacturing soap comprising the steps of:
    feeding a soap compound into a barrel having a pulverizing/kneading chamber extending substantially horizontally, two shafts extending substantially horizontally through said pulverizing/kneading chamber and rotatably supported by said barrel with bearings, said two shafts being provided with feeding helical gears generating a forward driving force and engaging with each other between said two shafts and returning helical gears generating a backward driving force and engaging with each other between said two shafts with their tooth spaces communicating with tooth spaces of said feeding gears, the chamber of said barrel being formed along the peripheral configuration of said feeding and returning helical gears,
    kneading and/or pulverizing/kneading the soap compound in said barrel by rotating said two shafts together with said feeding and returning helical gears, and
    moving the soap compound positioned through tooth spaces of said feeding and returning helical gears and space between the teeth of said feeding and returning helical gears and said barrel to discharge the soap compound from said barrel.

11. A method for kneading a soap compound and pulverizing fine particles contained in the soap compound comprising the steps of:
    feeding a soap compound into a barrel having a pulverizing/kneading chamber extending substantially horizontally, two shafts extending substantially horizontally through said pulverizing/kneading chamber and rotatably supported by said barrel with bearings, said two shafts being provided with feeding helical gears generating a forward driving force and engaging with each other between said two shafts and returning helical gears generating a backward driving force smaller than the forward driving force and engaging with each other between said two shafts with their tooth spaces communicating with tooth spaces of said feeding gears, the chamber of said barrel being formed along the peripheral configuration of said feeding and returning helical gears, kneading and/or pulverizing the soap compound in said barrel by rotating said two shafts together with said feeding and returning helical gears such that engaging portions of the feeding and returning gears move downwardly, and moving forwardly, in said barrel, the soap compound positioned through tooth spaces of the feeding and returning helical gears and a space between the teeth of the feeding and returning helical gears and said barrel such that the soap compound is fed forwardly by the forward driving force of the rotating feeding helical gears and returned backwardly by the backward driving force of the rotating returning helical gears, to discharge the soap compound from the barrel.

* * * * *